United States Patent
Wei et al.

(10) Patent No.: US 10,489,422 B2
(45) Date of Patent: Nov. 26, 2019

(54) REDUCING DATA VOLUME DURABILITY STATE FOR BLOCK-BASED STORAGE

(71) Applicant: Amazon Technologies, Inc., Seattle, WA (US)

(72) Inventors: Danny Wei, Seattle, WA (US); Kerry Quintin Lee, Seattle, WA (US); James Michael Thompson, Seattle, WA (US); John Luther Guthrie, II, Seattle, WA (US); Jianhua Fan, Seattle, WA (US); Nandakumar Gopalakrishnan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 41 days.

(21) Appl. No.: 15/464,267

(22) Filed: Mar. 20, 2017

(65) Prior Publication Data

US 2017/0206260 A1   Jul. 20, 2017

Related U.S. Application Data

(63) Continuation of application No. 14/204,943, filed on Mar. 11, 2014, now Pat. No. 9,600,203.

(51) Int. Cl.
*G06F 16/27* (2019.01)
*G06F 3/06* (2006.01)
(Continued)

(52) U.S. Cl.
CPC ............ *G06F 16/27* (2019.01); *G06F 3/0604* (2013.01); *G06F 3/064* (2013.01); *G06F 3/065* (2013.01);
(Continued)

(58) Field of Classification Search
CPC ............ G06F 17/30575; G06F 3/0604; G06F 3/0611; G06F 3/064; G06F 3/065;
(Continued)

(56) References Cited

U.S. PATENT DOCUMENTS 5,634,052 A   5/1997   Morris
6,996,586 B2   2/2006   Stanley et al.
(Continued)

FOREIGN PATENT DOCUMENTS

CN   101764712   6/2010
JP   H0659819   3/1994
(Continued)

OTHER PUBLICATIONS

U.S. Appl. No. 14/204,992, filed Mar. 11, 2014, Danny Wei.
(Continued)

*Primary Examiner* — Eric Cardwell
(74) *Attorney, Agent, or Firm* — Robert C. Kowert; Meyertons, Hood, Kivlin, Kowert & Goetzel, P.C.

(57) ABSTRACT

A block-based storage system may implement reducing durability state for a data volume. A determination may be made that storage node replicating write requests for a data volume is unavailable. In response, subsequent write requests may be processed according to a reduced durability state for the data volume such that replication for the data volume may be disabled for the storage node. Write requests may then be completed at a fewer number of storage nodes prior to acknowledging the write request as complete. Durability state for the data volume may be increase in various embodiments. A storage node may be identified and replication operations may be performed to synchronize the current data volume at the storage node with a replica of the data volume maintained at the identified storage node.

20 Claims, 11 Drawing Sheets

(51) Int. Cl.
*H04L 29/08* (2006.01)
*G06F 11/20* (2006.01)

(52) U.S. Cl.
CPC ............ *G06F 3/067* (2013.01); *G06F 3/0611* (2013.01); *G06F 3/0665* (2013.01); *G06F 3/0683* (2013.01); *G06F 11/2069* (2013.01); *H04L 67/1095* (2013.01); *H04L 67/1097* (2013.01); *G06F 3/0623* (2013.01)

(58) Field of Classification Search
CPC ...... G06F 3/0665; G06F 3/067; G06F 3/0683; G06F 11/2069; G06F 3/0623; H04L 67/1095; H04L 67/1097
See application file for complete search history.

(56) References Cited

U.S. PATENT DOCUMENTS

| | | |
|---|---|---|
| 7,418,620 B1 | 8/2008 | Tormasov et al. |
| 7,657,578 B1 | 2/2010 | Karr et al. |
| 7,831,682 B2 | 11/2010 | Certain et al. |
| 8,266,401 B2 | 9/2012 | Nagata et al. |
| 8,341,115 B1 | 12/2012 | Natanzon et al. |
| 8,452,732 B2 | 5/2013 | Yakushev et al. |
| 8,473,776 B2 | 6/2013 | Soran et al. |
| 8,539,513 B1 | 9/2013 | Starr et al. |
| 8,583,893 B2 | 11/2013 | Pruthi et al. |
| 8,612,700 B1 | 12/2013 | Armstrong et al. |
| 9,600,203 B2 | 3/2017 | Wei et al. |
| 2004/0204975 A1 | 2/2004 | Morishita et al. |
| 2005/0038968 A1 | 2/2005 | Iwamura et al. |
| 2011/0022801 A1 | 1/2011 | Flynn |
| 2011/0119459 A1 | 5/2011 | Satoyama et al. |
| 2011/0252186 A1 | 10/2011 | Dinker |
| 2011/0307736 A1 | 12/2011 | George et al. |
| 2012/0159102 A1 | 6/2012 | Kan |
| 2012/0303999 A1 | 11/2012 | Calder et al. |
| 2013/0007219 A1 | 1/2013 | Sorenson, III |
| 2013/0013562 A1 | 1/2013 | Sudhakar |
| 2013/0042056 A1 | 2/2013 | Shats et al. |
| 2013/0151467 A1 | 6/2013 | Krishnan et al. |
| 2013/0166831 A1 | 6/2013 | Atkisson et al. |
| 2013/0226870 A1 | 8/2013 | Dash |
| 2013/0246840 A1 | 9/2013 | Kumano et al. |
| 2013/0290249 A1 | 10/2013 | Merriman et al. |

FOREIGN PATENT DOCUMENTS

| | | |
|---|---|---|
| JP | 20000066843 | 3/2000 |
| JP | 09026916 | 10/2004 |
| JP | 20050050165 | 2/2005 |
| JP | 2005062928 | 3/2005 |
| JP | 20060012142 | 1/2006 |
| JP | 20060285991 | 10/2006 |
| JP | 2004348174 | 12/2014 |
| WO | 2012125315 | 9/2012 |
| WO | 2013024485 | 2/2013 |

OTHER PUBLICATIONS

International Search Report and Written Opinion from PCT/US/19087, dated Jun. 18, 2015, Amazon Technologies, Inc., pp. 1-15.
Extended European Search Report from PCT/US2015019087, dated Sep. 26, 2017, Amazon Technologies, Inc., pp. 1-9.
Office Action from Japanese Patent Application No. 2016-556707, dated Sep. 12, 2017 (English translation and Japanese version), Amazon Technologies, Inc., pp. 1-.

US 10,489,422 B2

REDUCING DATA VOLUME DURABILITY STATE FOR BLOCK-BASED STORAGE

This application is a continuation of U.S. patent application Ser. No. 14/204,943, filed Mar. 11, 2014, now U.S. Pat. No. 9,600,203, which is hereby incorporated by reference herein in its entirety.

BACKGROUND

The recent revolution in technologies for dynamically sharing virtualizations of hardware resources, software, and information storage across networks has increased the reliability, scalability, and cost efficiency of computing. More specifically, the ability to provide on demand virtual computing resources and storage through the advent of virtualization has enabled consumers of processing resources and storage to flexibly structure their computing and storage costs in response to immediately perceived computing and storage needs. Virtualization allows customers to purchase processor cycles and storage at the time of demand, rather than buying or leasing fixed hardware in provisioning cycles that are dictated by the delays and costs of manufacture and deployment of hardware. Rather than depending on the accuracy of predictions of future demand to determine the availability of computing and storage, users are able to purchase the use of computing and storage resources on a relatively instantaneous as-needed basis.

Virtualized computing environments are frequently supported by block-based storage. Such block-based storage provides a storage system that is able to interact with various computing virtualizations through a series of standardized storage calls that render the block-based storage functionally agnostic to the structural and functional details of the volumes that it supports and the operating systems executing on the virtualizations to which it provides storage availability. However, as network transmission capabilities increase, along with greater processing capacity for virtualized resources, I/O demands upon block-based storage may grow. If I/O demands exceed the capacity of block-based storage to service requests, then latency and/or durability of block-based storage performance for virtualized computing resources suffer, resulting in a loss of virtualized computing performance.

Figure 1:
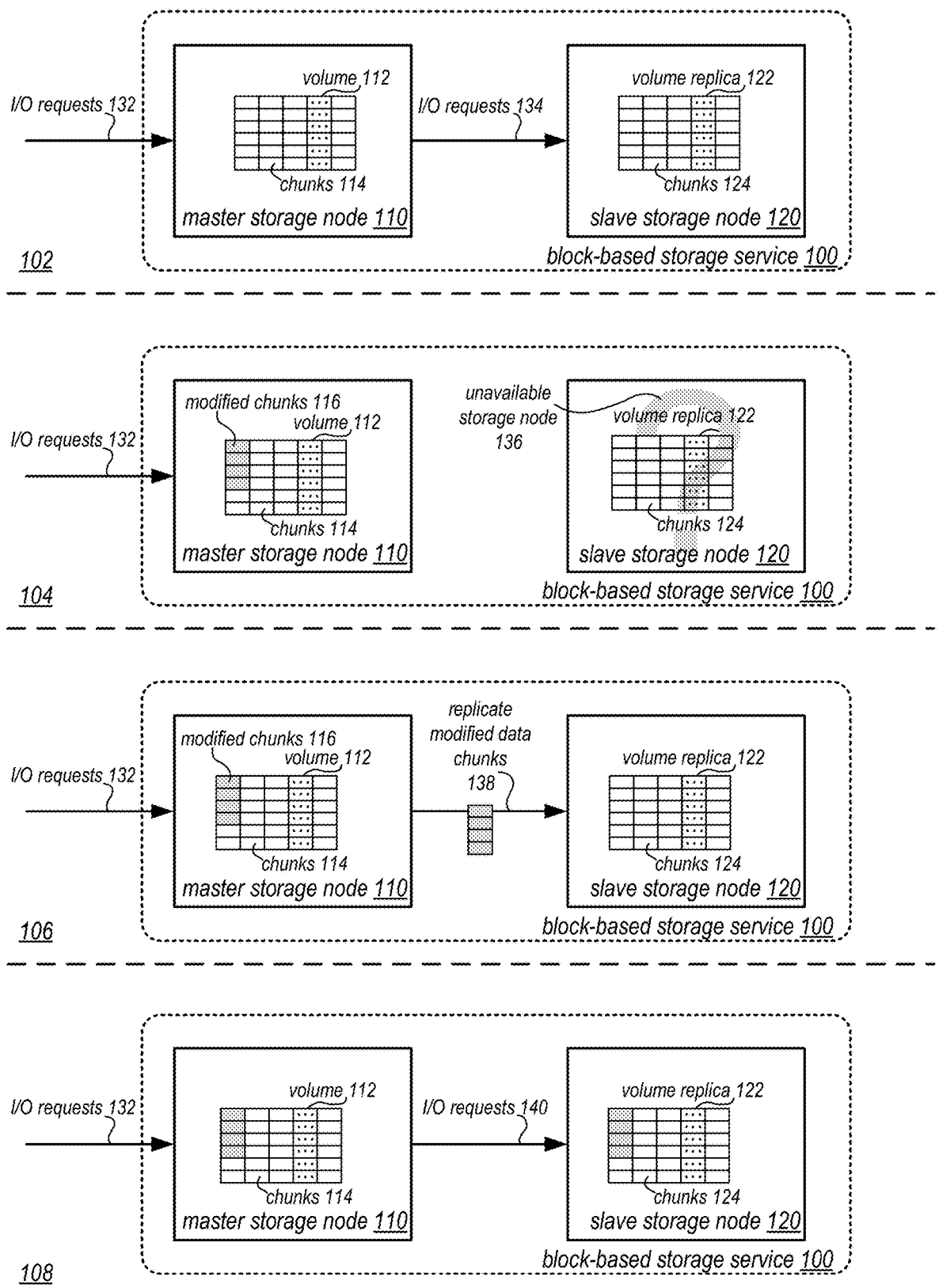
FIG. 1 is a series of block diagrams illustrating reducing data volume durability state for block-based storage and efficient data volume replication for block-based storage, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement reducing data volume durability state for block-based storage. Block-based storage systems may establish a durability state for data volumes maintained by the block-based storage systems by increasing a number of replicas maintaining a current version of a data volume, in various embodiments. The durability state for a data volume may be enforced for the data volume, as part of a rule, requirement, or other guarantee of the block-based storage system maintaining the data volume. Replication operations among storage nodes maintaining replicas of a particular data volume may ensure that changes to a data volume may be made across the data volume replicas in order to maintain the current version of the data volume in accordance with the durability state for the data volume. However, replication operations among storage nodes may become disrupted. Network partitions, high network utilization, or system failures are some of the many different events that may disrupt replication operations for a data volume. These disruptions in replication operations may result in a storage node maintaining a replica of data volume becoming unavailable for replication with other storage nodes, violating the durability state for the data volume. Write requests and other input/output operations directed toward the data volume may be blocked as the durability state for the data volume is not satisfied. Reducing durability state for data volumes in block-based storage systems may allow operations directed toward the data volume to continue with little interruption in the event that durability state for the data volume cannot be maintained. In some embodiments, a reduction in durability state for a data volume may not significantly risk the durability of a data volume (e.g., if only done so for a limited time).

The system and methods described herein may implement efficient data volume replication. As noted above, multiple replicas of data volumes may be maintained at different storage nodes to establish durability for a data volume, in some embodiments. If a data volume is no longer maintained at multiple storage nodes, such as may occur when the data volume is in a reduced durability state, modifications to portions of the data volume may be maintained in order to indicate changes made to a data volume upon entering a reduced durability state. For example, if a data volume is maintained at a master storage node and a slave storage node, and the slave storage node becomes unavailable for replication, the master storage node may continue to process input/output (I/O) for the data volume and record which portions of the data volume have been changed. At a later time, the master storage node may be able increase the durability state of the data volume by replicating the data volume at another storage node maintaining a stale replica of the data volume (such as the prior slave storage node, or another storage node maintaining a replica of the data volume). Modified portions of the data volume may be sent to update the stale replica without sending portions of the data volume that are not out of data in the state replica, reducing the amount of time to perform the replication and/or lower the amount network traffic between the master storage node and the new slave storage node. Once the stale replica is up-to-date, replication operations for the data volume between the master storage node and the new slave storage node may be enabled for future changes to the data volume.

FIG. 1 is a series of block diagrams illustrating reducing data volume durability state for block-based storage and efficient data volume replication, according to some embodiments. Block-based storage service 100 may implement a master storage node 110 and a slave storage node 120 to establish a durability state for data volume 112 Master storage node 110 and slave storage node 120 may be storage servers or other computing systems (e.g., computing system 2000 described below with regard to FIG. 11) which may implement persistent block-based storage (e.g., hard disk drives or solid state drives) to store replicas of data volume 112 and 122 respectively. In various embodiments, data volume replicas 112 and 122 may be divided into respective data chunks 114 and 124 for replication operations such that data chunks 114 correspond to the data chunks 124.

As illustrated in scene 102, I/O requests 132 (e.g., write requests) are received at the master storage node, which may complete the I/O requests 132. For example, write requests to modify portions of data volume 112 received at master storage node 110 may be performed. The I/O requests may then, in some embodiments, be forwarded 134 on to slave storage node 120 for replication of any changes made to the data at the master storage node 110. In this way, the current durability state for the data volume 112 may be satisfied.

As illustrated at scene 104, slave storage node 120 has become unavailable 136. This may be due to network conditions, such as a network partition, high amounts of network traffic, system failure, or under the direction of a control system (e.g., which may direct slave storage node 120 to cease maintaining volume replica 122). I/O requests 132 may, however, still be received at master storage node 110. Instead of blocking, failing, or otherwise not completing write requests, the durability state for data volume 110 may be reduced. For instance, in some embodiments, I/O requests 132 may be completed at master storage node 110, and acknowledged back to a client or other system, component or device that requested I/O 132. Therefore, the I/O requests 132 (as received in scene 104) may be completed at master storage node 110 without being completed at any other storage node (such as slave storage node 120 or another storage node in block-based storage service 100). In another example, with more than two storage nodes (e.g., 3 storage nodes), reducing the durability state for a data volume maintained at the 3 storage nodes (such as reducing the durability state to 2 storage nodes) may allow for I/O requests to be completed at a fewer number of storage nodes prior to acknowledging the I/O requests as complete.

In various embodiments, master storage node 110 may track the changes made to data volume 112 while operating in a reduced durability state. For example, data chunks that are modified 116 may be marked, indexed, listed, or otherwise identified (e.g., in data volume metadata). At some time a determination may be made to enable replication for a data volume in order to process I/O requests according to an increased the durability state for data volume 112. This determination may be made based on several factors, such as the availability of storage nodes to store another replica of a data volume, current network utilization, traffic, or other network events, or the state of durability for the data volume (e.g., replicated on 1 storage node, 2 storage nodes, etc.). In order to increase the durability state, another storage node to maintain the data volume replica may be identified. For example, a control system may send a list of storage node identifiers to master storage node 110, or master storage node 110 itself may retain a list of previous storage nodes that maintained replicas of the data volume. Once a slave storage node 120 is identified (in the illustrated example the identified storage node 120 is the most recent storage node that maintained a replica of the data volume, however other storage nodes that also maintain a stale replica of the data volume or no replica of the data volume at all may be selected), the modified data chunks 116 may be replicated 138 to the slave storage node 120 to be stored in volume replica 122, as illustrated in scene 106. Unmodified data chunks need not be replicated. As illustrated at scene 108, replication may again be enabled for the data volume as I/O requests 132 are again sent 140 to slave storage node 120 for replication, increasing the durability state for data volume 112 to be maintained at both master storage node 110 and slave storage node 120.

Please note that previous descriptions are not intended to be limiting, but are merely provided as a reducing state and efficient replication for block-based storage systems. For example, the number of storage nodes, or the number of data volumes may be different than illustrated in FIG. 1. Different replication schemes (e.g., no master or slave roles) may be implemented, and different durability states may be established for a data volume. In some embodiments, a reduction in durability state may occur when more than one storage node becomes unavailable (e.g., 3 storage nodes to 1 available storage node).

This specification begins with a general description block-based storage services provider, which may implement reducing data volume durability state and efficient data volume replication. Then various examples of a block-based storage services provider are discussed, including different components/modules, or arrangements of components/module that may be employed as part of implementing a block-based storage services provider. A number of different methods and techniques to implement reducing data volume durability state and efficient data volume replication are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
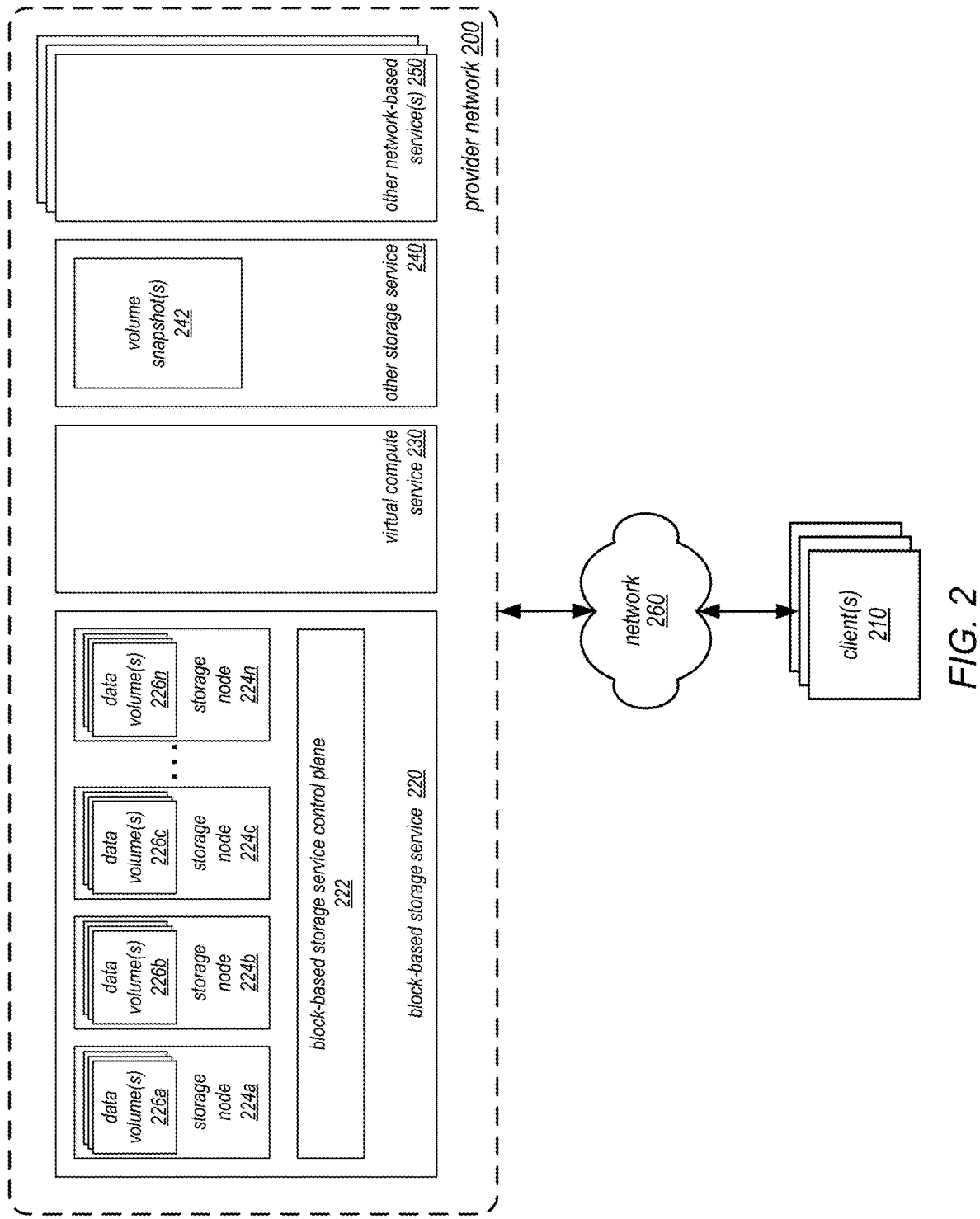
FIG. 2 is a block diagram illustrating a provider network implementing multiple network-based services including a block-based storage service that implements reducing data volume durability state and efficient data volume replication for block-based storage, according to some embodiments.

FIG. 2 is a block diagram illustrating a provider network implementing multiple network-based services including a block-based storage service that implements optimized write performance during snapshot operations, according to some embodiments. Provider network 200 may be set up by an entity such as a company or a public sector organization to provide one or more services (such as various types of cloud-based computing or storage) accessible via the Internet and/or other networks to clients 210. Provider network 200 may include numerous data centers hosting various resource pools, such as collections of physical and/or virtualized computer servers, storage devices, networking equipment and the like (e.g., computing system 2000 described below with regard to FIG. 11), needed to implement and distribute the infrastructure and services offered by the provider network 200. In some embodiments, provider network 200 may provide computing resources, such as virtual compute service 230, storage services, such as block-based storage service 220 and other storage service 240 (which may include various storage types such as object/key-value based data stores or various types of database systems), and/or any other type of network-based services 250. Clients 210 may access these various services offered by provider network 200 via network 260. Likewise network-based services may themselves communicate and/or make use of one another to provide different services. For example, computing resources offered to clients 210 in units called "instances," such as virtual or physical compute instances or storage instances, may make use of particular data volumes 226, providing virtual block storage for the compute instances.

As noted above, virtual compute service 230 may offer various compute instances to clients 210. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 230 in different embodiments, including general purpose or special purpose computer servers, storage devices, network devices and the like. In some embodiments instance clients 210 or other any other user may be configured (and/or authorized) to direct network traffic to a compute instance. In various embodiments, compute instances may attach or map to one or more data volumes 226 provided by block-based storage service 220 in order to obtain persistent block-based storage for performing various operations.

Compute instances may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client applications, without for example requiring the client 210 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

In various embodiments, provider network 200 may also implement block-based storage service 220 for performing storage operations. Block-based storage service 220 is a storage system, composed of a pool of multiple independent storage nodes 224a, 224b, 224c through 224n(e.g., server block data storage systems), which provide block level storage for storing one or more sets of data volumes data volume(s) 226a, 226b, 226c, through 226n. Data volumes 226 may be mapped to particular clients, providing virtual block-based storage (e.g., hard disk storage or other persistent storage) as a contiguous set of logical blocks. In some embodiments, a data volume 226 may be divided up into multiple data chunks (including one or more data blocks) for performing other block storage operations, such as snapshot operations or replication operations.

A volume snapshot of a data volume 226 may be a fixed point-in-time representation of the state of the data volume 226. In some embodiments, volume snapshots 242 may be stored remotely from a storage node 224 maintaining a data volume, such as in another storage service 240. Snapshot operations may be performed to send, copy, and/or otherwise preserve the snapshot of a given data volume in another storage location, such as a remote snapshot data store in other storage service 240.

Block-based storage service 220 may implement block-based storage service control plane 222 to assist in the operation of block-based storage service 220. In various embodiments, block-based storage service control plane 222 assists in managing the availability of block data storage to clients, such as programs executing on compute instances provided by virtual compute service 230 and/or other network-based services located within provider network 200 and/or optionally computing systems (not shown) located within one or more other data centers, or other computing systems external to provider network 200 available over a network 260. Access to data volumes 226 may be provided over an internal network within provider network 200 or externally via network 260, in response to block data transaction instructions.

Block-based storage service control plane 222 may provide a variety of services related to providing block level storage functionality, including the management of user accounts (e.g., creation, deletion, billing, collection of payment, etc.). Block-based storage service control plane 222 may further provide services related to the creation, usage and deletion of data volumes 226 in response to configuration requests. Block-based storage service control plane 222 may also provide services related to the creation, usage and deletion of volume snapshots 242 on other storage service 240. Block-based storage service control plane 222 may also provide services related to the collection and processing of performance and auditing data related to the use of data volumes 226 and snapshots 242 of those volumes.

Provider network 200 may also implement another storage service 240, as noted above. Other storage service 240 may provide a same or different type of storage as provided by block-based storage service 220. For example, in some embodiments other storage service 240 may provide an object-based storage service, which may store and manage data as data objects. For example, volume snapshots 242 of various data volumes 226 may be stored as snapshot objects for a particular data volume 226. In addition to other storage service 240, provider network 200 may implement other network-based services 250, which may include various different types of analytical, computational, storage, or other network-based system allowing clients 210, as well as other services of provider network 200 (e.g., block-based storage service 220, virtual compute service 230 and/or other storage service 240) to perform or request various tasks.

Clients 210 may encompass any type of client configurable to submit requests to network provider 200. For example, a given client 210 may include a suitable version of a web browser, or may include a plug-in module or other type of code module configured to execute as an extension to or within an execution environment provided by a web browser. Alternatively, a client 210 may encompass an application such as a database application (or user interface thereof), a media application, an office application or any other application that may make use of compute instances, a data volume 226, or other network-based service in provider network 200 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 210 may be configured to generate network-based services requests according to a Representational State Transfer (REST)-style network-based services architecture, a document- or message-based network-based services architecture, or another suitable network-based services architecture. In some embodiments, a client 210 (e.g., a computational client) may be configured to provide access to a compute instance or data volume 226 in a manner that is transparent to applications implement on the client 210 utilizing computational resources provided by the compute instance or block storage provided by the data volume 226.

Clients 210 may convey network-based services requests to provider network 200 via external network 260. In various embodiments, external network 260 may encompass any suitable combination of networking hardware and protocols necessary to establish network-based communications between clients 210 and provider network 200. For example, a network 260 may generally encompass the various telecommunications networks and service providers that collectively implement the Internet. A network 260 may also include private networks such as local area networks (LANs) or wide area networks (WANs) as well as public or private wireless networks. For example, both a given client 210 and provider network 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and provider network 200. It is noted that in some embodiments, clients 210 may communicate with provider network 200 using a private network rather than the public Internet.

Block-based storage service 220 may manage and maintain data volumes 226 in a variety of different ways. Different durability schemes may be implemented for some data volumes among two or more storage nodes maintaining a replica of a data volume. For example, different types of mirroring and/or replication techniques may be implemented (e.g., RAID 1) to increase the durability of a data volume, such as by eliminating a single point of failure for a data volume. In order to provide access to a data volume, storage nodes may then coordinate I/O requests, such as write requests, among the two or more storage nodes maintaining a replica of a data volume. For storage nodes providing write optimization during a snapshot operation, additional coordination may be implemented.

Figure 3:
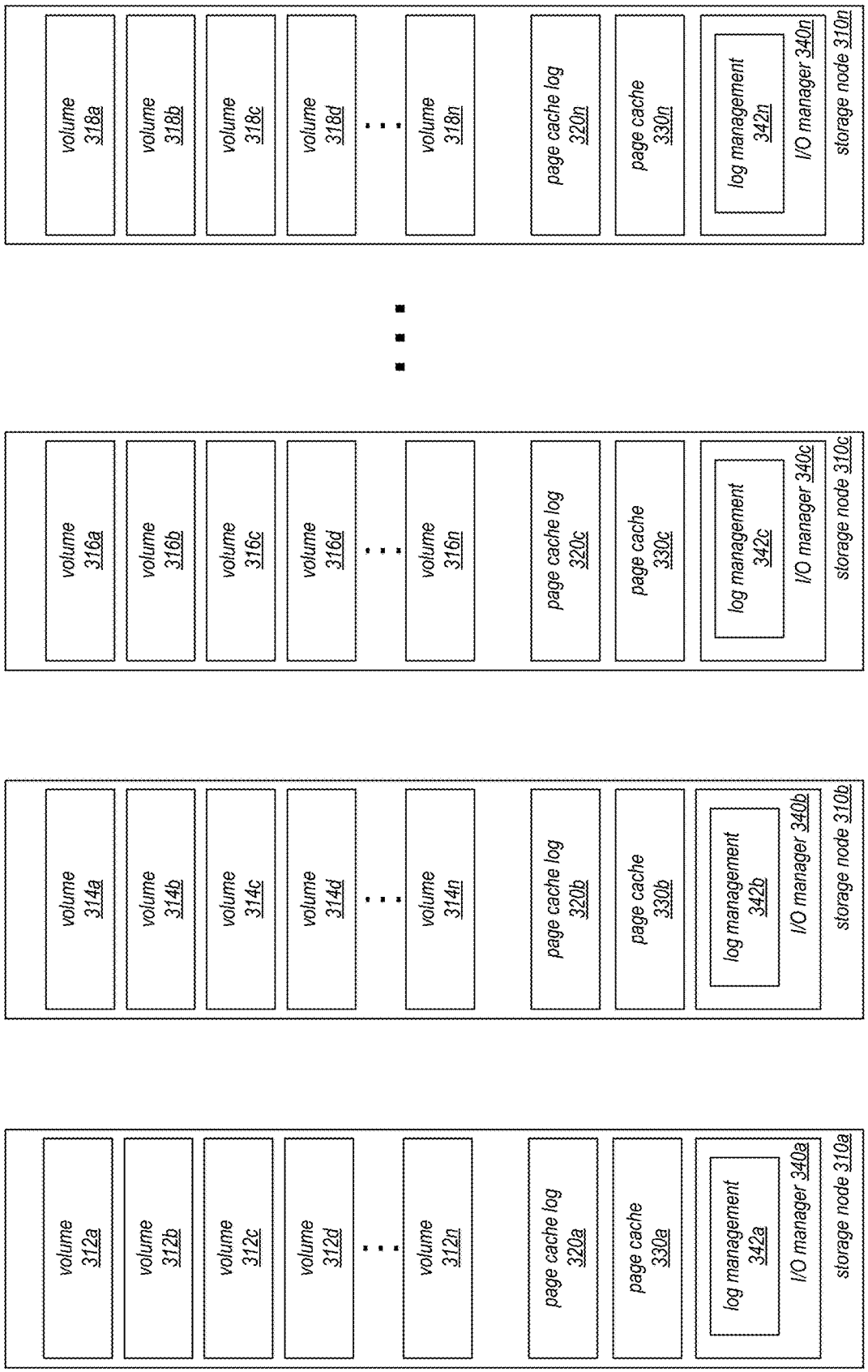
FIG. 3 is a block diagram illustrating storage nodes that implement reducing data volume durability state and efficient data volume replication, according to some embodiments.

FIG. 3 is a block diagram illustrating storage nodes that implement reducing data volume durability state and efficient data volume replication, according to some embodiments. Multiple storage nodes, such as storage nodes 310a, 310b, 310c through 310n, may be implemented in order to provide block-based storage services. A storage node 310 may be one or more computing systems or devices, such as a storage server or other computing system (e.g., computing system 2000 described below with regard to FIG. 11). Each storage node 310 may maintain respective replicas of data volumes. For instance, storage node 310a maintains data volumes 312a, 312b, 312c, 312d through 312n, storage node 310b maintains data volumes 314a, 314b, 314c, 314d through 314n, storage node 310c maintains data volumes 316a, 316b, 316c, 316d through 316n, through storage node 310n maintaining data volumes 318a, 318b, 318c, 318d through 318n. While storage nodes 310 are depicted as having equal numbers of data volumes, numbers of data volumes maintained on storage nodes may vary from storage node 310 to other storage node 310. Some data volumes may differ in size from other data volumes, in some embodiments. Storage nodes 310 may also provide multi-tenant storage. For example, in some embodiments, data volume 316a maintained at storage node 310c may be maintained for one account of block-based storage service 220, while data volume 316b also maintained at storage node 310c may be maintained for a different account. Storage nodes 310 may persist their respective data volumes in one or more block-based storage devices (e.g., hard disk drives, solid state drives, etc.) that may be directly attached to a computing system or device implementing the respective storage node.

Block-based storage service 220 may manage and maintain data volumes in a variety of different ways. Different durability schemes may be implemented for some data volumes among two or more storage nodes maintaining a same replica of a data volume establishing a durability state for a data volume. For example, different types of mirroring and/or replication techniques may be implemented (e.g., RAID 1) to increase the durability of a data volume, such as by eliminating a single point of failure for a data volume. In order to provide access to a data volume, storage nodes may then coordinate I/O requests, such as write requests, among the two or more storage nodes maintaining a replica of a data volume. For example, for a given data volume 312a, storage node 310a may serve as a master storage node. A master storage node may, in various embodiments, receive and process requests (e.g., I/O requests) from clients of the data volume. Thus, storage node 310a may then coordinate replication of I/O requests, such as write requests, or any other changes or modifications to data volume 312a to one or more other storage nodes serving as slave storage nodes. For instance, storage node 310c may maintain data volume 316d which is a replica of data volume 312a. Thus, when a write request is received for data volume 312a at storage node 310a, storage node 310a may forward the write request to storage node 310c and wait until storage node 310c acknowledges the write request as complete before completing the write request at storage node 310. Master storage nodes may direct other operations for data volumes, like snapshot operations or other I/O operations (e.g., serving a read request).

Please note, that in some embodiments, the role of master and slave storage nodes may be assigned per data volume. For example, for data volume 312a maintained at storage node 310a, storage node 310a may serve as a master storage node. While for another data volume, such as data volume 312b, maintained at storage node 310a, storage node 310a may serve as a slave storage node.

In various embodiments, storage nodes 310 may each implement a respective page cache. A page cache may be a portion of system memory or other memory device that stores pages or other groupings of data from one of the data volumes 312 maintained a respective storage node. Instead of directly writing to or reading from a block-based storage device maintaining the portion of requested data of a data volume, the page cache may be updated. For example, if a read request is received for a portion of a data volume, it may first be determined whether the data resides in the page cache. If yes, then the data may be read from the page cache. If no, then the data may be retrieved from the respective block-based storage device maintaining the portion of the requested data of the data volume and written into the page cache for future use. Similarly, a write request may be directed toward the page cache. For a received write request, a page cache entry corresponding to the data to be written (e.g., a portion of a data volume already maintained in the page cache) may be updated according to the write request. Similarly, if the data to be modified by the write request is not in the page cache, the data may be first obtained from the block-based storage device that persists the data, written into a new page cache entry in the page cache, and then updated according to the write request. Page cache techniques are well-known to those of ordinary skill in the art, and thus, the previous examples are not intended to be limiting as to other page cache techniques.

In various embodiments, storage nodes 310 may implement respective page cache logs, such as page cache logs 320a, 320b, 320c through 320n. Page cache logs may store log records describing updates to the respective page cache, such as write requests that modify data maintained in the page cache 330. Thus, in the event of a system or other failure that causes a loss of data in the page cache 330, log records in the page cache log 320 may be used to restore the page cache to a state prior to the failure. Log records may be stored sequentially according to the order in which updates are made to page cache 330, in some embodiments. For example, write request 1A is received, performed, and a corresponding log record 1A is stored. Then write request 1B is received, performed, and a corresponding log record 1B is stored, and so on. By storing log records sequentially, log records may be replayed or re-applied in the order in which they are stored to generate a state of the page cache at a particular point in time.

Moreover, sequential storage of log records may decrease write latency for storing log records. Page cache logs 320 may be implemented as a persistent storage device (e.g., a hard-disk drive, solid state drive (SSD), or other block-based storage device). Sequential writes to such types of persistent storage devices are often faster than random access writes. In various embodiments, page cache logs 320 may be implemented on a dedicated block storage device for the storage node. The persistent storage device persisting the page cache log may be separate from block-based storage devices persisting data volumes at a storage node, in some embodiments.

Storage nodes 310 may implement respective I/O managers, such as I/O managers 340a, 340b, 340c through 340n. I/O managers 340 may handle I/O request directed toward data volumes maintained at a particular storage node. Thus, I/O manager 340b may process and handle a write request to volume 314b at storage node 310b, for example. I/O manager 340 may be configured to process I/O requests according to block-based storage service application programming interface (API) and/or other communication protocols, such as such as internet small computer system interface (iSCSI). In some embodiments, I/O managers 340 may implement respective log management components, such as log management 342a, 342b, 342c through 342n. Log management components may perform various log management functions, such as trimming log records and/or performing page cache recovery based, at least in part, on log records.

Figure 4:
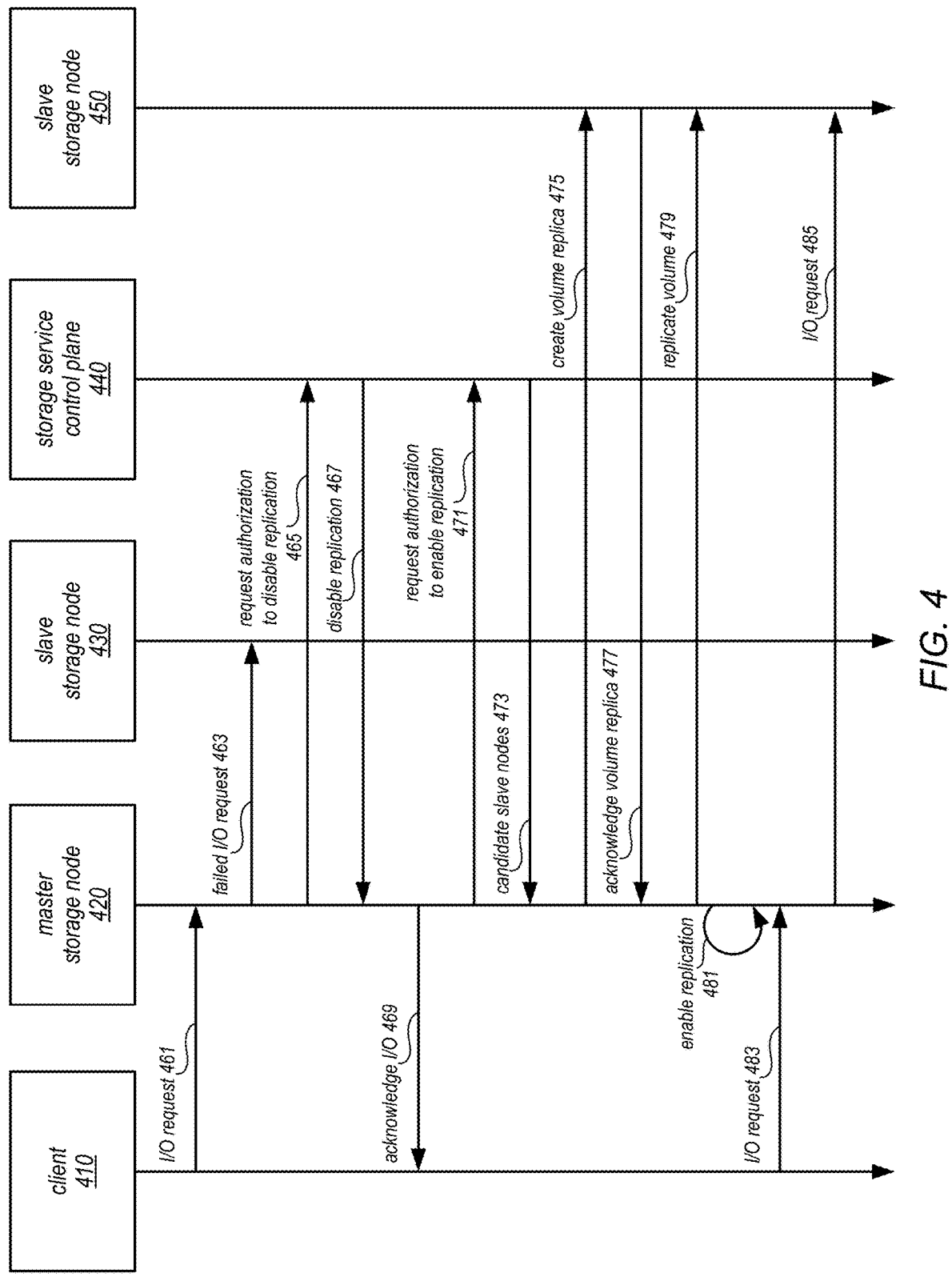
FIG. 4 is a sequence diagram illustrating interactions between clients, master storage nodes, slave storage nodes and a control plane when reducing durability state for a data volume, according to some embodiments.

Please note that FIG. 3 provides an example of storage nodes that may be implemented in a block-based storage service. Other arrangements or configurations of storage nodes may also be implemented in some embodiments, such as storage nodes that do not implement a page cache write log FIG. 4 is a sequence diagram illustrating interactions between clients, master storage nodes, slave storage nodes and a control plane when reducing durability state for a data volume, according to some embodiments. Client 410 may send an I/O request 461 (e.g., write request) to master storage node 420 for a particular data volume of which storage node 420 is the master storage node. As part of satisfying a current durability state for the data volume, master storage node 420 may attempt to replicate the I/O request with slave storage node 430, but may ultimately fail 463. As noted above, various, network partitions, high network utilization, system failures, or any other type of event may disrupt replication operations for the data volume. For example, in a scenario where a network partition occurs between master storage node 420 and slave storage node 430, master storage node's 420 failed I/O request 463 may never reach slave storage node 430. In response to determining that slave storage node 430 is unavailable for replication, master storage node may attempt to enter a reduced durability state for the data volume by requesting authorization 465 from storage service control plane 440 to disable replication for the data volume. Storage service control plane 440 may, based on various factors, such as the current network status (e.g., is there a network partition, mass failure, large amount of network traffic) allow master storage node 420 to operate at reduced durability and disable replication 467. Once a reduced durability state for the data volume is authorized, master storage node 420 may be authorized to acknowledge I/O 469 for the particular data volume.

At some point, master storage node 420 (or control plane 440) may wish to resume a greater durability state for the data volume. For instance, master storage node 420 may wait until a certain amount of time has elapsed, or a certain number of modifications to the data volume are received, before attempting to increase the durability state for the data volume. A request from master storage node 420 may be sent to storage service control plane 440 to authorize the enabling of replication for the data volume 471. Based on factors similar to those discussed above, the storage service control plane may send a list of candidate slave storage nodes 473 to the master storage node 420. The list of candidate storage nodes may include storage nodes that maintain stale replicas of the data volume that are not current and/or storage nodes that do not maintain a replica of the data volume but have capacity to store a replica of the data volume. In some embodiments, master storage node 420 may not need to obtain a list of candidate storage nodes but may maintain a list of candidate slave storage nodes locally (e.g., storage nodes the master storage node 420 previously replicated with for the data volume). Master storage node 420 may select a slave node from the list of candidate storage nodes, such as new slave storage node 450 to replicate a data volume with 450. Master storage node may send a request to create a new volume replica 475 of the data volume on slave storage node 450. Slave storage node 450 may acknowledge the crated volume replica 477. Master storage node 420 may then commence one or more replication operations to replicate the volume as maintained at the master storage node 420. Each replication operation may send a portion of the data volume to new slave storage node 450 to be stored. Once replication is complete, master storage node 420 may enable replication 481 again for the data volume, processing I/O requests in accordance with the increased durability state of the data volume. For example, I/O request 483 received at master storage node 420 is now sent 485 to new slave storage node 450.

Figure 5:
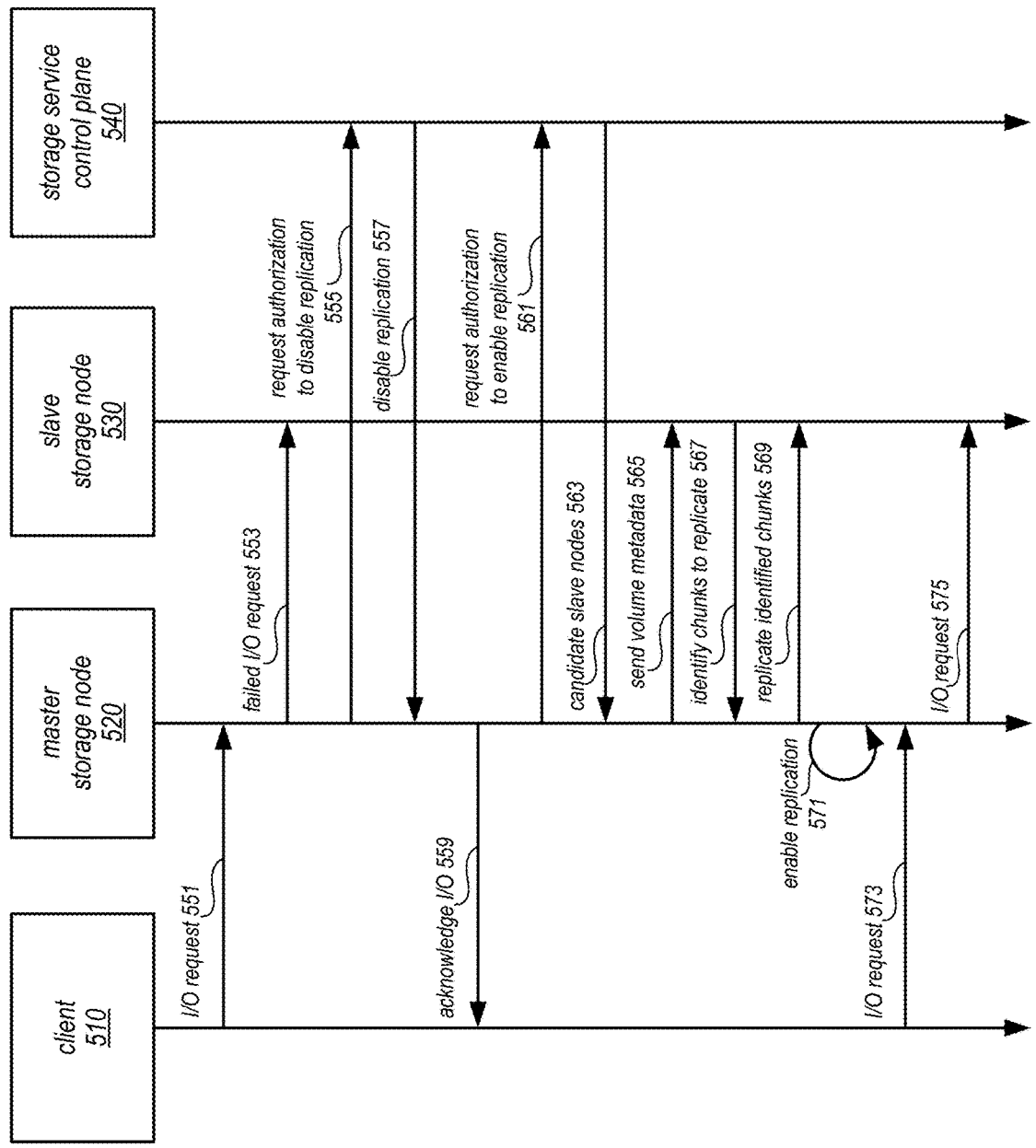
FIG. 5 is a sequence diagram illustrating interactions between master storage nodes and a slave storage node performing efficient replication operations for a data volume from a reduced durability state to an increased durability state, according to some embodiments.

In some embodiments, various efficient data volume replication techniques may be implemented when transitioning from a reduced durability state to an increase durability state for a data volume. FIG. 5 is a sequence diagram illustrating interactions between master storage nodes and a slave storage node performing efficient data volume replication operations from a reduced durability state to an increased durability state, according to some embodiments. Client 510 may send an I/O request 551 to master storage node 520. As discussed above with regard to FIG. 4, the I/O request may fail because the slave storage node 530 is unavailable. Master storage node 520 may request authorization to disable replication 555 and enter a reduced durability state for the data volume. Based on various factors (e.g., is there a network partition, mass failure, large amount of network traffic), the storage service control plane 540 may authorize disabling of replication 557, allowing master storage node to again complete and acknowledge I/O 559.

At some point in time master storage node 520 may wish to increase the durability state for the data volume, and request authorization to enable replication 561 from storage service control plane 540. Again as above, based on various factors, storage service control plane may authorize replication and send candidate slave nodes 563 to master storage node. Candidate slave nodes 563 may include storage nodes that maintain stale (i.e. out of date) replicas of the data volume. Stale replicas may result from previous pairings between the candidate storage node and the master storage node 520 replicating changes to the data volume. Using the listing of candidate storage nodes master storage node 520 may be configured to select a slave to storage node, such as by identifying the slave storage node with the least amount of data to replicate. For example, in some embodiments, master storage node 520 may send volume metadata indicating version numbers for data chunks in the volume 565 to a prospective slave storage node. The slave storage node may evaluate the volume metadata by comparing it to its own volume metadata for the stale replica, and identify data chunks in its own replica the need to be replicated.

The identified data chunks may be indicated to the master storage node 567. If there are more than one slave storage nodes with stale replicas, the slave storage node with the least number of data chunks needed (or the greatest number of non-stale data chunks may selected as the new slave storage node). In some embodiments, this selection may be made in combination with other factors, such as the current amount of network traffic being directed toward a candidate slave storage node and/or the workload of the slave storage node. In FIG. 5, slave storage node 530 is selected (as the most recent slave storage node it had the least differences with the data volume on the master storage node). Identified data chunks are then replicated 569 to the slave storage node to synchronize the replicas of the data volume maintained at the master storage node and the slave storage node 520. In this way, data chunks in the stale replica of the data volume need not be updated, in various embodiments. Replication may then be enabled 571 for the data volume in order to process requests according to an increased durability state for the data volume. Thus, I/O request 473 sent to master storage node 520 may be sent on 575 to slave storage node 530 as part of replicating the data volume, restoring the durability state of the data volume.

Please note, that in some embodiments, the role of master and slave storage nodes may be assigned per data volume. For example, for one data volume maintained at a storage node, the storage node may serve as a master storage node. While for another data volume maintained at the same storage node, the storage node may serve as a slave storage node.

Figure 6:
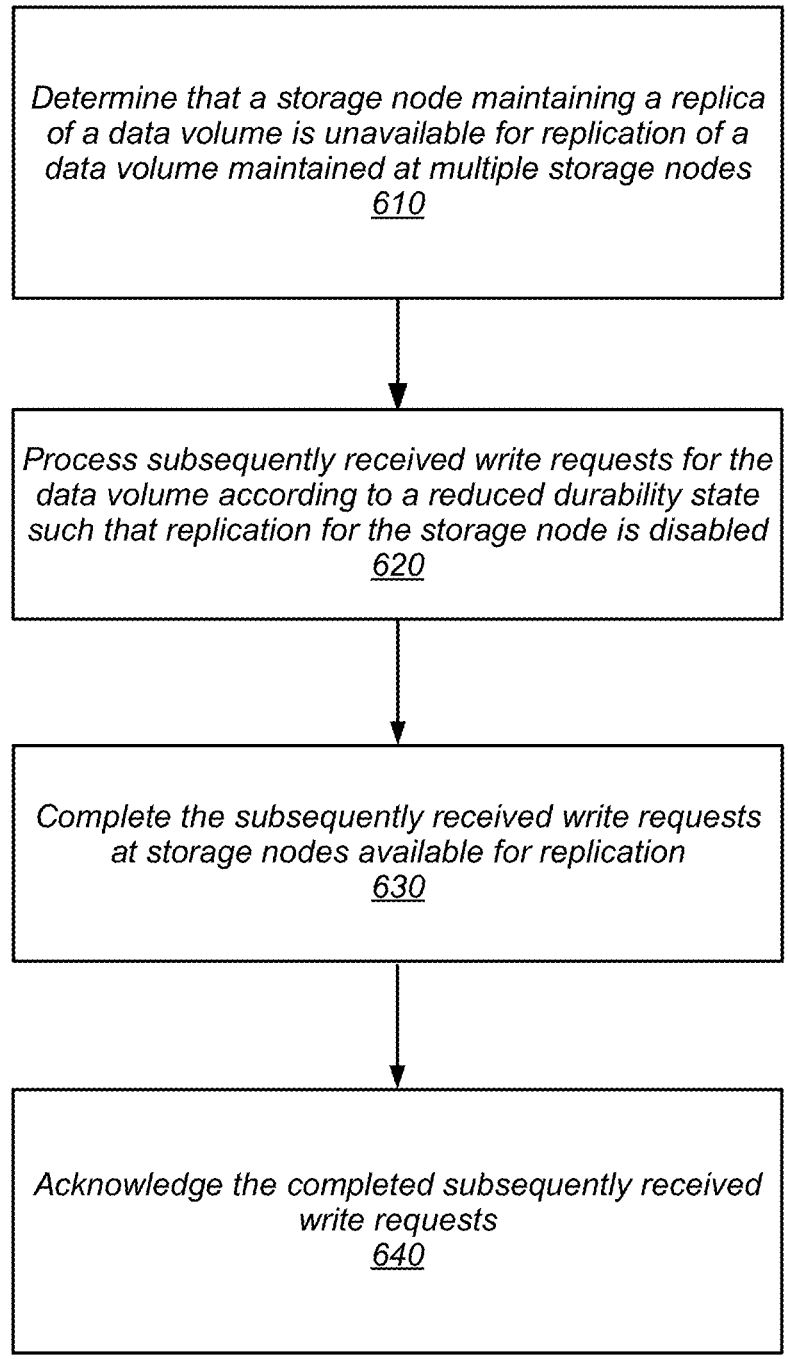
FIG. 6 is a high-level flowchart illustrating various methods and techniques for reducing durability for block-based storage, according to some embodiments.

The examples of reducing data volume durability state for block-based storage and efficient data volume replication for block-based storage discussed above with regard to FIGS. 2-5 have been given in regard to a block-based storage service. Various other types or configurations of block-based storage may implement these techniques. For example, different configurations of storage nodes may also implement various numbers of replicas, mirroring, or other durability techniques that may establish a durability state for the data volume different than a master and slave(s) model discussed above. FIG. 6 is a high-level flowchart illustrating various methods and techniques for reducing data volume durability for block-based storage, according to some embodiments. These techniques may be implemented using one or more storage nodes (or other system component that maintains a data volume in block-based storage) as described above with regard to FIGS. 2-5.

A group of storage nodes may, in some embodiments, maintain replicas of a data volume in block-based storage. The group of storage nodes may establish a durability state for the data volume by completing write requests received for the data volume at each of the storage nodes in the group before acknowledging a write request as complete in order to perform replication for the data volume. In some embodiments, these storage nodes may be referred to as a peer storage node. As indicated at 610, a determination may be made that a storage node of a group of storage nodes maintaining a replica of a data volume is unavailable for replication. For example, if 3 storage nodes are maintaining a replica of a data volume and 1 of the 3 storage nodes becomes unavailable. A storage node may become unavailable for replication for many reasons, including, but not limited to, network partitions, high network utilization, system failures, or any other type of event. In some embodiments, the determination may be made at a another storage node of the group of storage nodes, that a peer storage node maintaining a replica of data volume maintained at the storage node is unavailable for replicating write requests. For example, a write request sent to the peer storage node may never be acknowledged, various heartbeat or other gossip protocols indicating health or status to peer storage nodes may indicated the storage node is unavailable. In some embodiments, a control system, such as block-based storage service control plane 222 in FIG. 2, may send an indication to the other storage node that the peer storage node is unavailable.

However determined, in response, processing of subsequently received write requests for the data volume may be performed according to a reduced durability state for the data volume such that replication for the data volume is disable for the unavailable storage node, as indicated at 620. The change in durability state may be recorded or indicated in information maintained about the data volume, such as may be maintained at storage nodes in the group of storage nodes maintaining the data volume. In some embodiments, a control system, such as block-based storage service control plane 222 in FIG. 2, may update block-based storage system information indicating that the particular data volume is operating according to a reduced durability state.

When a subsequent write request is received for a data volume with a reduced durability state, the write request is completed at storage nodes that are available for replication, as indicated at 630. Thus, the write request may be completed at a fewer number of storage nodes than prior to the reduction in durability state. For instance, if 1 storage node of 5 storage nodes maintaining a replica of a data volume is unavailable for replication, and the durability state for the data volume is reduced, then 4 of the 5 storage nodes, which are available for replication, may complete the write request (which is fewer than the 5 storage nodes which would have completed the write request). In some embodiments, such as those described above with regard to FIG. 4 which include only a master storage node and slave storage node, write requests may be completed for a data volume at a single storage node, without being completed at any other storage node in a block-based storage system. In effect, the write request is only completed at the storage node that received the write request, in various embodiments. No other storage node may replicate or complete the write request in such a scenario. The write request completed according to the reduced durability state may then be acknowledged to a client, as indicated at 640.

Figure 7:
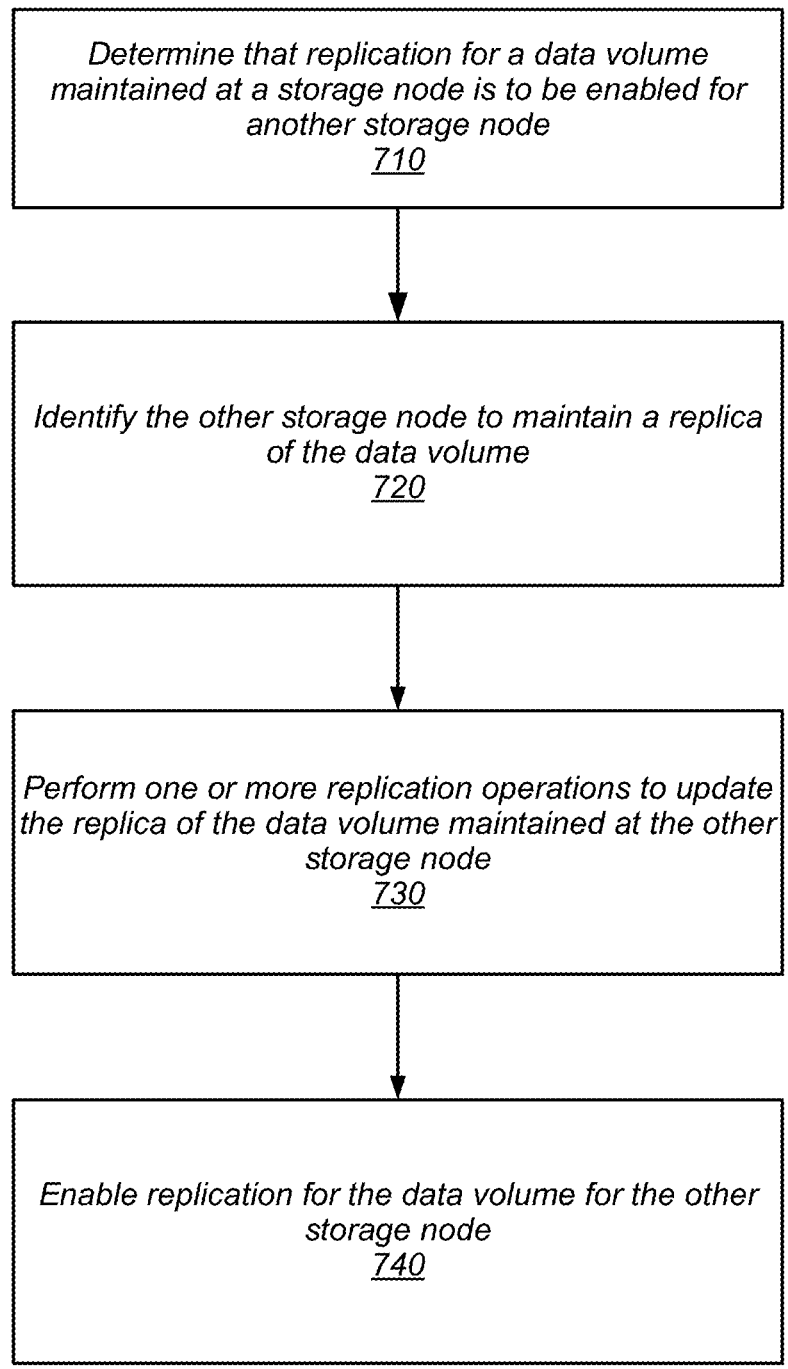
FIG. 7 is a high-level flowchart illustrating various methods and techniques for increasing durability state for a data volume from a reduced durability state, according to some embodiments.

FIG. 7 is a high-level flowchart illustrating various methods and techniques for restoring a durability state for a data volume, according to some embodiments. As indicated at 710, a determination may be made that replication for a data volume maintained at a storage node is to be enabled for another storage node in order to process write requests according to an increased durability state. In various embodiments, this determination may be made by a control system, such as block-based storage service control plane 222 in FIG. 2, or by a storage node itself.

Various different factors may determine when to increase a durability state for the data volume by enabling replication. In some embodiments, the number of available storage nodes to serve as a peer storage node (master or slave) may change. For instance, if the number of available storage nodes increases, then replication may be enabled for the data volume as the capacity to store another replica of the data volume may increase. Another factor, the status of a block-based storage system as a whole (whether or not the physical infrastructure in particular location such as a data center) may be considered. The number of replication operations in a block-based storage system occurring among storage nodes in the block-based storage system, may also be considered. In some embodiments, the durability state of the data volume may also be considered. For, example, if the data volume is archived or backed up to another data store besides the block-based storage system, or whether or not particular hardware optimizations, such as page cache write logging discussed above with regard to FIG. 3 is implemented. In some embodiments, another factor may be the availability of a desired or preferred peer storage node to perform replication with. For instance, a preferred peer may currently be performing multiple replication operations and unable able to begin replication for the data volume at that time. In various embodiments, one, some, or all of these various factors may be used to evaluate when to enable replication. In some embodiments, a prioritization scheme or ordering may be used to weight each factor, break ties between when replication should be enabled for one data volume and not another.

Figure 8:
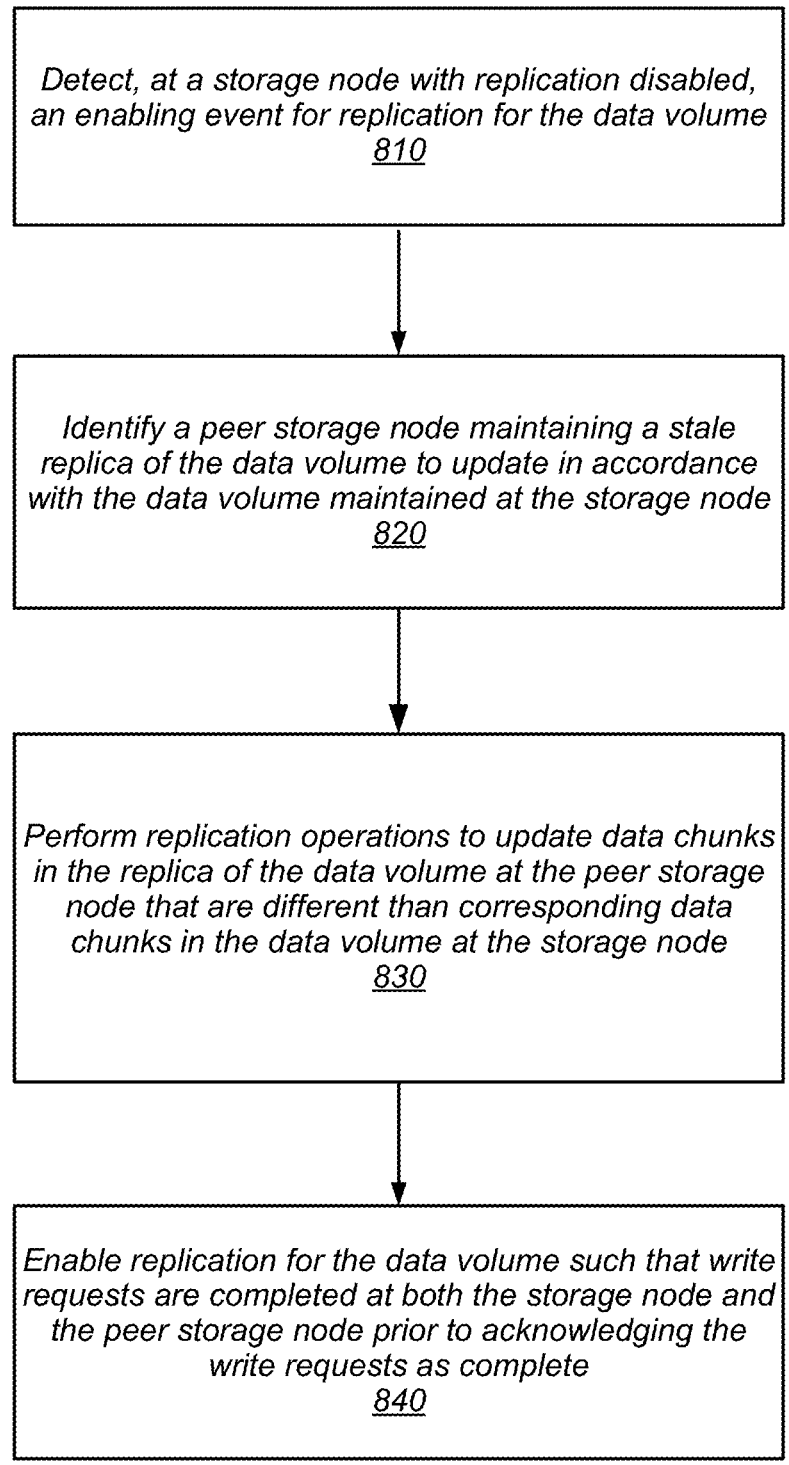
FIG. 8 is a high-level flowchart illustrating various methods and techniques for efficient replication for a data volume, according to some embodiments.

As indicated at 720, another storage node may be identified to maintain a replica for the data volume, in some embodiments. This storage node may be a previous peer maintaining a stale replica of the data volume, in some embodiments. In some embodiments, the identified storage node may be a new storage node that does not maintain a replica of the data volume. Once identified, one or more replication operations may be performed to update a replica of the data volume stored in the other storage node. Replication operations may include sending some or all of the data chunks of the data volume maintained at the storage node to the other storage node to be written into the replica of the data volume maintained there. FIG. 8 describes efficient replication techniques in more detail below, such as techniques to send data chunks that have been modified subsequent to a data volume entering a reduced durability state. Once the replication operations are complete, and the data volume maintained at the storage node and the other storage node are synchronized, replication may be enabled at the storage node such that write requests are not acknowledged as complete until the write is complete at both the storage node and the other storage node, as indicated at 740. Write requests may then be acknowledged when completed at the storage node and the other storage node which now maintains a current version of the data volume. As discussed above, in some embodiments multiple storage nodes may maintain a replica of a data volume, such that a reduced durability state of storage nodes (e.g., 4 storage nodes) is increased to add an additional storage node, as indicated at 720, 730, and 740 (e.g., increased to 5 storage nodes). When write requests are received for the data volume with replication enabled for the other storage node, then write requests may be completed at the multiple storage nodes and the other storage node prior to acknowledging the write request as complete (e.g., completed at all 5 storage nodes prior to acknowledgement).

FIG. 8 is a high-level flowchart illustrating various methods and techniques for efficient data volume replication, such as occurs when increasing a durability state for a data volume, according to some embodiments. In various embodiments, stale replicas may be maintained at storage nodes that were once part of a group of storage nodes (such as a pair of storage nodes) with a storage node maintaining a current version of a data volume, such as storage node operating in a reduced durability state for the data volume. Advantage may be taken of these stale replicas to identify a peer storage node with less replication to be performed in order to synchronize replicas between storage nodes. As indicated at 810, an enabling event may be detected at a storage node for replication for a data volume. An enabling event for replication may be determined or triggered, similar to element 710 discussed above, such as based on various factors including, but not limited to, the durability state of the data volume, availability of other storage nodes to store a replica of the data volume, or network utilization among the block-based storage system.

Figure 9:
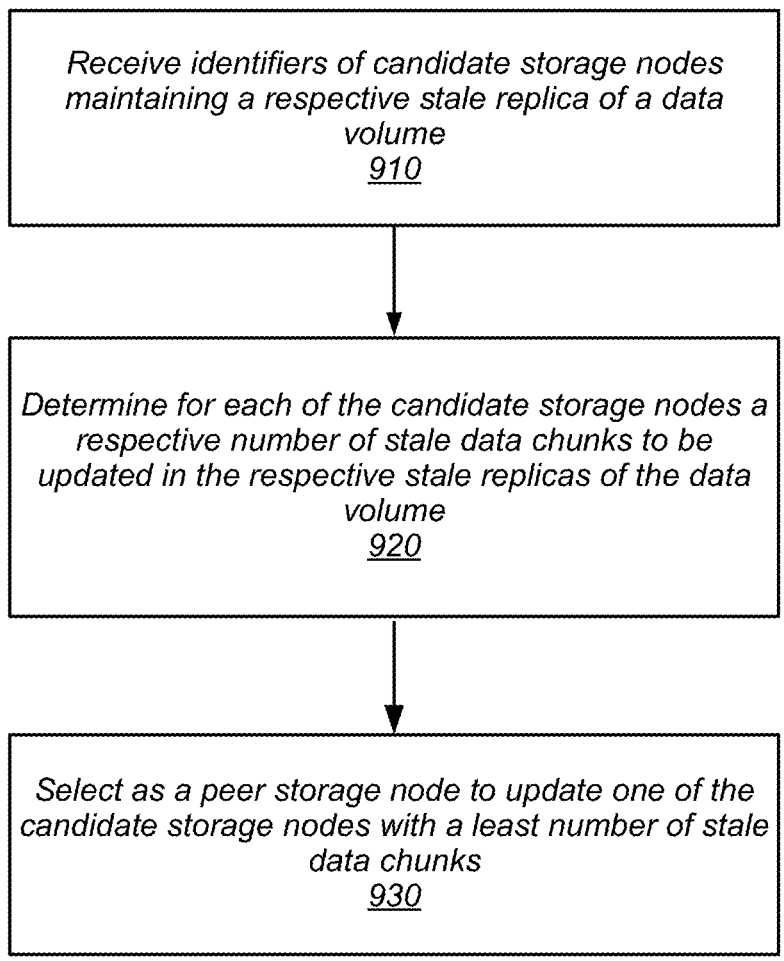
FIG. 9 is a high-level flowchart illustrating various methods and techniques for identifying a storage node with a stale replica to update, according to some embodiments.

A peer storage node may be identified that maintains a stale replica of the data volume to update in accordance with the data volume maintained at the storage node, as indicated at 820. In some embodiments, the identified storage node may be the most recent storage node maintaining a stale replica of the data volume to perform replication operations for the data volume. FIG. 9 is a high-level flowchart illustrating various methods and techniques for identifying a storage node with a stale replicate to update, according to some embodiments. As indicated at 910, identifiers of candidate storage nodes maintaining respective stale replicas of a data volume may be received at the storage node, in various embodiments. A control system, such as control plane 222 in FIG. 2 may track previous storage nodes which have maintained replicas of a data volume. In some embodiments, the control plane may create the list of candidate storage nodes from a subset of the number of storage nodes maintaining a stale replica of the data volume, according to various factors (e.g., whether a storage node is available, healthy, has a history of prior failures, or current workload). In some embodiments, the storage node itself may track or retain a history of storage nodes that the storage node performed replication operations with for the data volume. Storage node identifiers, such as network addresses of these storage nodes, may be sent to or retained at the storage node.

In some embodiments, a determination may be made for each of the candidate storage nodes as to a respective number of stale data chunks to be updated in the respective stale replicas of the data volume, as indicated at 920. For example, in some embodiments, when write requests are received at a storage node with replication disabled, metadata for the data volume may be updated to indicate which data chunks were changed (e.g., a monotonically increasing version number may be maintained for each data chunk). The candidate storage nodes also may maintain volume metadata with respective version numbers for each data chunk of the stale replica. This volume metadata for the stale replicas, however, may be stale as well. Therefore, differences in data chunks between stale replicas of the data volume and the current version of the data volume may be identified. For example, in some embodiments, the storage node may query each of the candidate storage nodes to compare their volume metadata with the current volume metadata for the data volume. The candidate storage nodes may send identifiers of the data chunks that need to be updated in order to synchronize the replicas of the data volume. Based, on these respective numbers of stale data chunks, a peer storage node may be selected to update. For example, this selected storage node may be one of the candidate storage nodes with a least number of stale data chunks, as indicated at 930. In some embodiments, other factors may also be used in combination with the amount of stale data chunks to be updated to select the peer storage node to update. For example, the current workload, network traffic directed to, or other information about the performance or capability of a particular candidate storage node to perform replication may also be used. If, for instance, one candidate storage node may have more data chunks to be updated than another candidate storage node, but has a greater capacity to perform replication operations (e.g., the other candidate storage node is performing replication operations for another data volume or other work), then the candidate storage node with more data chunks to be update may be selected.

Turning back to FIG. 8, once selected, replication operations to update data chunks in the replica of the data volume at the peer storage node to match the corresponding data chunks in the data volume at the storage node may be performed, as indicated 830. Thus, in some embodiments, only those data chunks that are not synchronized (i.e. do not match) between the storage nodes need be updated, reducing the network traffic required to send data chunks between the storage nodes. For those data chunks that match between the stale replica of the data volume and the current version of the data volume, no replication operations may be performed. Once the replication operations are complete, replication for the data volume may be enabled at both the storage node and the peer storage node. Write requests are not acknowledged as complete until performed at both the storage node and the peer storage node.

Figure 10:
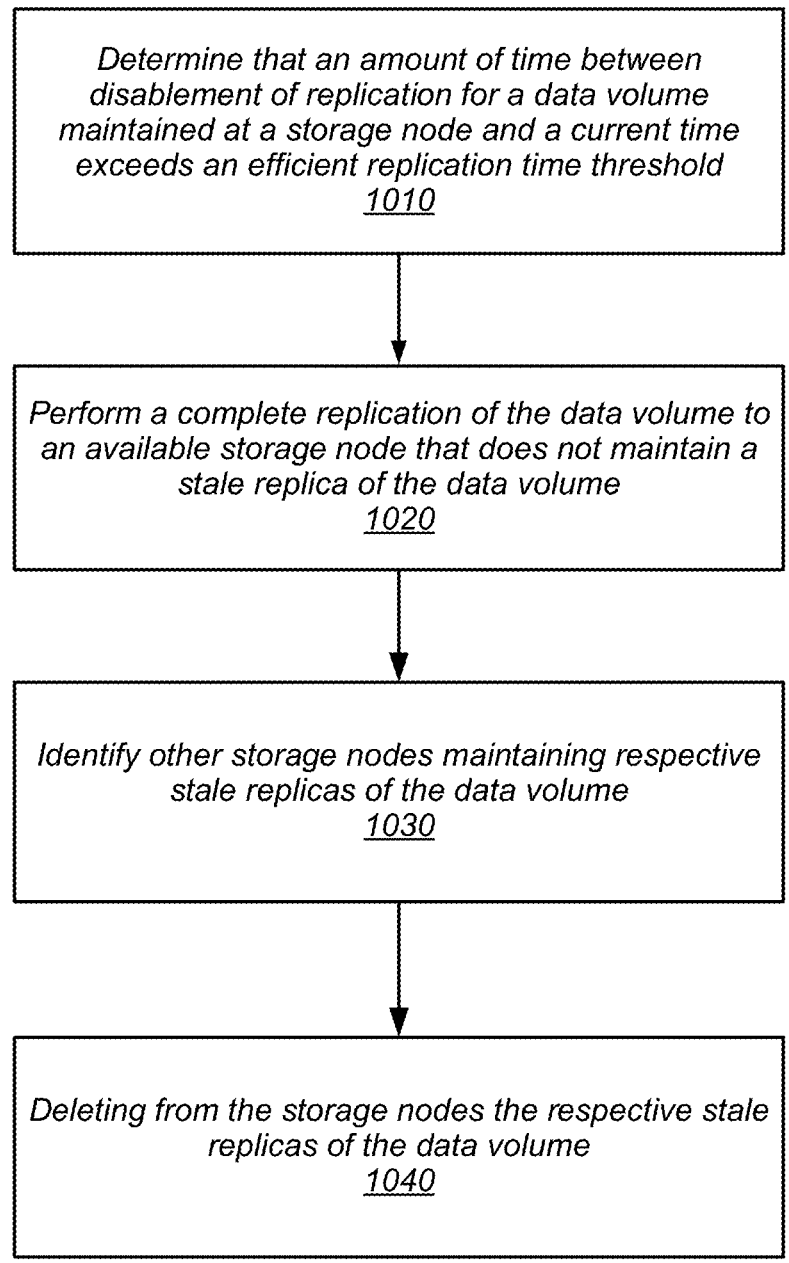
FIG. 10 is a high-level flowchart illustrating various methods and techniques for determining that efficient replication may not be performed, according to some embodiments.

FIG. 10 is a high-level flowchart illustrating various methods and techniques for determining that efficient replication for a data volume may not be performed, according to some embodiments. As indicated at 1010, a determination may be made for a storage node attempting to identify a peer storage node with a stale replica of a data volume that an amount of time between the entering of a reduced durability state which may disable replication for a data volume maintained at a storage node and a current time exceeds an efficient replication time threshold. An efficient time threshold may indicate an amount of time at which stale replicas are so out of date that replicating new replica is more efficient performing replication operations to update a stale replica at a storage node. In some embodiments, the efficient time replication threshold may be determined for a particular data volume, such as based on the durability state of the data volume (e.g., whether the data volume is backed up or archived in another location). In response, a complete replication of the data volume to an available storage node that does not maintain a stale replica of the data volume may be performed, as indicated at 1020. Other determinations that efficient replication may not be performed for a data volume may be based on different information besides time. For example, in some embodiments, the number of stale data chunks (i.e. the amount of data to be updated) to replace in the candidate storage nodes exceeds an efficient data amount threshold for data replication, and a new replica of the data volume may be created instead.

For storage nodes maintaining stale replicas for which an amount of time, such as described with regard to 1010, data, or other consideration renders efficient replication techniques inefficient, the stale replicas may themselves be identified, as indicated at 1030. A control system, such as control plane 222 in FIG. 2 may request that the storage nodes delete the respective stale replicas, as indicated at 1040. In some embodiments, a storage node itself may determine that a particular stale replica maintained at the storage node may no longer need to be maintained and delete the stale replica.

The methods described herein may in various embodiments be implemented by any combination of hardware and software. For example, in one embodiment, the methods may be implemented by a computer system (e.g., a computer system as in FIG. 11) that includes one or more processors executing program instructions stored on a computer-readable storage medium coupled to the processors. The program instructions may be configured to implement the functionality described herein (e.g., the functionality of various servers, storage nodes, control planes, managers and/or other components, such as those that implement the block-based storage service described herein). The various methods as illustrated in the figures and described herein represent example embodiments of methods. The order of any method may be changed, and various elements may be added, reordered, combined, omitted, modified, etc.

Figure 11:
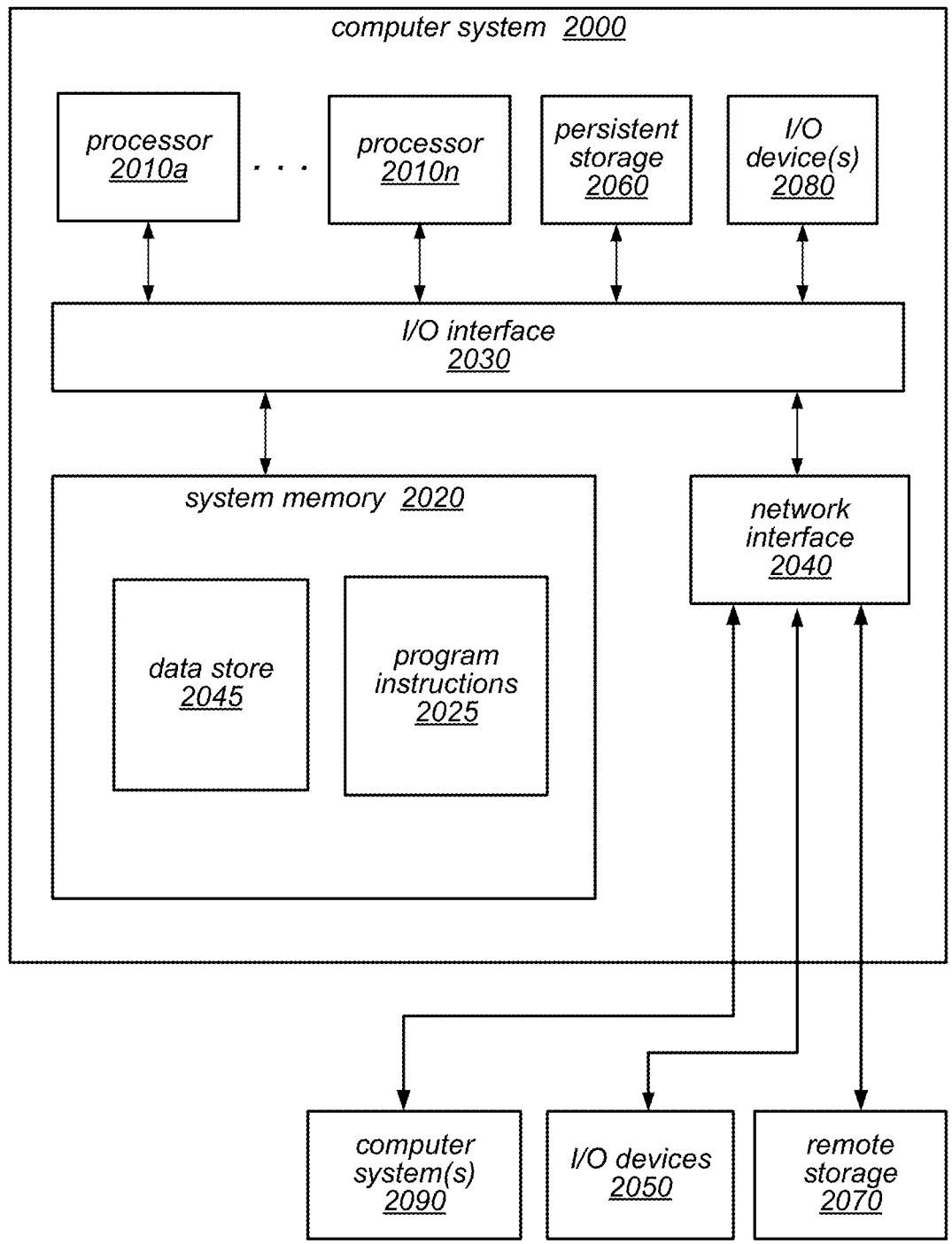
FIG. 11 is a block diagram illustrating an example computing system, according to some embodiments.

Embodiments of reducing durability state for block-based storage and efficient data volume replication as described herein may be executed on one or more computer systems, which may interact with various other devices. FIG. 11 is a block diagram illustrating an example computer system, according to various embodiments. For example, computer system 2000 may be configured to implement storage and/or compute nodes of a compute cluster, a data stores, and/or a client, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, block-based storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage system server node, and persistent storage 2060 may include the SSDs attached to that server node.

Computer system 2000 includes one or more system memories 2020 that are configured to store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 2025 may be encoded in platform native binary, any interpreted language such as Java™ byte-code, or in any other language such as C/C++, Java™, etc., or in any combination thereof. For example, in the illustrated embodiment, program instructions 2025 include program instructions executable to implement the functionality of a storage node, in different embodiments. In some embodiments, program instructions 2025 may implement multiple separate clients, nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be configured as described herein. In general, system memory 2020 (e.g., data store 2045 within system memory 2020), persistent storage 2060, and/or remote storage 2070 may store data blocks, replicas of data blocks, metadata associated with data blocks and/or their state, configuration information, and/or any other information usable in implementing the methods and techniques described herein.

In one embodiment, I/O interface 2030 may be configured to coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems 2090, for example. In addition, network interface 2040 may be configured to allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 11 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   a plurality of storage nodes comprising a number of the storage nodes, wherein each of the storage nodes maintains respective replicas of a data volume, and wherein to enforce a durability state for the data volume, a given write request received for the data volume is completed by the number of the storage nodes before the given write request for the data volume is acknowledged as complete; and
   one or more of the storage nodes, configured to:

determine that a particular one of the storage nodes is unavailable for replication; and in response to determining that the particular storage node is unavailable for replication, a remaining subset of the storage nodes available for replication is configured to, for one or more subsequently received write requests for the data volume:

complete the subsequently received write request for the data volume at each storage node of the remaining subset; and to enforce a reduced durability state for the data volume, acknowledge the subsequently received write request for the data volume as complete in response to completing the subsequently received write request for the data volume by another number of storage nodes of the remaining subset, wherein the other number of the storage nodes that complete the subsequently received write request before acknowledgment is less than the number of the storage nodes that complete the given write request before acknowledgement.

2. The system of claim 1, wherein the storage nodes are within a provider network and maintain the replicas of the data volume for a particular client, and wherein the particular client is within the provider network or is external to the provider network.

3. The system of claim 2, wherein the particular client comprises a user interface, a database application, or other software application configured to use the data volume for one or more operations.

4. The system of claim 2, wherein the plurality of storage nodes implement a network-based block-based storage service for the particular client and one or more other clients.

5. The system of claim 1, further comprising:

a control plane, configured to:

in response to receiving a request from a storage node for one or more candidate storage nodes to maintain another replica of the data volume:

determine that replication for the data volume is to be enabled; and in response to determining that replication for the particular data volume is to be enabled, send respective identifiers for the one or more candidate storage nodes to the requesting storage node.

6. The system of claim 5, further comprising:

the requesting storage node, configured to:

receive the respective identifiers for the one or more candidate storage nodes;

based, at least in part, on the identifiers, identify a particular one of the one or more candidate storage nodes to maintain another replica of the data volume;

perform one or more replication operations to update the other replica of the data volume in order to duplicate the replica of the particular data volume maintained at the requesting storage node; and enable replication for the particular data volume such that write requests received at the requesting storage node are sent to the other storage node.

7. A method, comprising:

performing, by one or more computing devices:

determining that a storage node of a plurality of storage nodes maintaining respective replicas of a data volume is unavailable for replication, wherein the plurality of storage nodes comprises a number of the storage nodes, and wherein prior to the unavailability of the storage node, to enforce a durability state for the data volume, a given write request received for the data volume is completed by the number of the storage nodes before the given write request for the data volume is acknowledged as complete; and in response to determining that the storage node is unavailable for replication, for one or more subsequently received write requests for the data volume:

completing the subsequently received write request for the data volume by each storage node of a remaining subset of the storage nodes; and to enforce a reduced durability state for the data volume, acknowledging the subsequently received write request for the data volume as complete in response to completing the subsequently received write request for the data volume by another number of storage nodes of the remaining subset, wherein the other number of the storage nodes that complete the subsequently received write request before acknowledgment is less than the number of the storage nodes that complete the given write request before acknowledgement.

8. The method of claim 7, wherein the storage nodes are within a provider network and maintain the replicas of the data volume for a particular client, and wherein the particular client is within the provider network or is external to the provider network.

9. The method of claim 8, wherein the particular client comprises a user interface, a database application, or other software application configured to use the data volume for one or more operations.

10. The method of claim 7, wherein the plurality of storage nodes includes a master storage node and a slave storage node, wherein the storage node that is determined to be unavailable for replication is a master storage node, wherein the given write request for the data volume is received at the master storage node, wherein the master storage node sends the given write request received at the master storage node to a slave storage node to be completed at the slave storage node, and wherein the method further comprises:

in response to determining that the storage node is unavailable for replication, promoting the slave storage node to be a new master storage node for the data volume, wherein the one or more subsequently received write requests for the data volume are received at the new master storage node;

wherein completing the subsequently received write request by each storage node of a remaining subset of the storage nodes is performed such that the subsequently received write request is completed at the new master storage node without completing the write request at any other storage node.

11. The method of claim 7, further comprising:

determining that replication for the data volume is to be enabled for another storage node in order to process write requests for the data volume according to an increased durability state; and in response to determining that replication for the data volume is to be enabled for the other storage node:

identifying the other storage node to maintain another replica of the data volume;

performing one or more replication operations to update the other replica of the data volume to replicate the data volume as maintained at the remaining subset; and enabling replication for the other storage node such that additional write requests are completed at the other storage node.

12. The method of claim 11, wherein the other storage node is different from the storage node, and wherein the one or more replication operations performed to update the other replica send a copy of the data volume maintained at the remaining subset to be stored as the other replica of the data volume.

13. The method of claim 11, wherein the plurality of storage nodes is implemented as part of a larger collection of storage nodes storing a plurality of different data volumes, wherein said determining that replication for the data volume is to be enabled is based, at least in part, on one or more of:
- a storage capacity among the larger collection of storage nodes to maintain the other replica of the data volume;
- network utilization among the larger collection of storage nodes; or
- a state of durability for the data volume.

14. The method of claim 7, wherein the plurality of storage nodes is part of a larger collection of storage nodes implementing a network-based block-based storage service, wherein write requests are received from one or more virtual compute instances implemented by a network-based virtual compute service, wherein the network-based block-based storage service and the network-based virtual compute service are implemented as part of a same provider network.

15. A non-transitory, computer-readable storage medium, storing program instructions that when executed by one or more computing devices cause the one or more computing devices to implement:
- determining that a storage node of a plurality of storage nodes maintaining respective replicas of a data volume is unavailable for replication, wherein the plurality of storage nodes comprises a number of the storage nodes, and wherein prior to the unavailability of the storage node, to enforce a durability state for the data volume, a given write request received for the data volume is completed by the number of the storage nodes before the given write request for the data volume is acknowledged as complete; and
- in response to determining that the storage node is unavailable for replication, for one or more subsequently received write requests for the data volume:
  - completing the subsequently received write request for the data volume by each storage node of a remaining subset of the storage nodes; and
  - to enforce a reduced durability state for the data volume, acknowledging the subsequently received write request for the data volume as complete in response to completing the subsequently received write request for the data volume by another number of storage nodes of the remaining subset, wherein the other number of the storage nodes that complete the subsequently received write request before acknowledgment is less than the number of the storage nodes that complete the given write request before acknowledgement.

16. The non-transitory, computer-readable storage medium of claim 15, wherein the storage nodes are within a provider network and maintain the replicas of the data volume for a particular client that is located within the provider network or external to the provider network, and wherein the particular client comprises a user interface, a database application, or other software application configured to use the data volume for one or more operations.

17. The non-transitory, computer-readable storage medium of claim 15, wherein the program instructions further cause the one or more computing devices to implement:
- determining that replication for the data volume is to be enabled for another storage node in order to process write requests for the data volume according to an increased durability state; and
- in response to determining that replication for the data volume is to be enabled for the other storage node:
  - identifying the other storage node to maintain another replica of the data volume;
  - performing one or more replication operations to update the other replica of the data volume to replicate the data volume as maintained at the one or more storage nodes; and
  - enabling replication for the other storage node such that additional write requests are completed at the other storage node prior to acknowledging the additional write requests as complete.

18. The non-transitory, computer-readable storage medium of claim 17, wherein the other storage node is the storage node, wherein the other replica of the data volume is the respective replica of the data volume, and wherein, in said performing the one or more replication operations to update the other replica of the data volume, the program instructions cause the one or more computing devices to implement:
- sending data chunks of the data volume that were modified subsequent to disabling replication for the data volume for the storage node in order to update the respective replica of the data volume.

19. The non-transitory, computer-readable storage medium of claim 17, wherein the plurality of storage nodes is implemented as part of a larger collection of storage nodes storing a plurality of different data volumes, and wherein said determining that replication for the data volume is to be enabled is based, at least in part, on one or more of:
- a storage capacity among the larger collection of storage nodes to maintain the other replica of the data volume;
- network utilization among the larger collection of storage nodes; or
- a state of durability for the data volume.

20. The non-transitory, computer-readable storage medium of claim 17, wherein the plurality of storage nodes is implemented as part of a larger collection of storage nodes storing a plurality of different data volumes, wherein write requests for at least some of the plurality of different data volumes are processed according to a respective reduced durability state, and wherein said determining that replication for the data volume is to be enabled is based, at least in part, on a prioritization scheme for increasing durability for the at least some data volumes with the respective reduced durability state.

* * * * *